United States Patent [19]
McKibben et al.

[11] Patent Number: 6,167,234
[45] Date of Patent: Dec. 26, 2000

[54] METHOD AND APPARATUS FOR GLOBAL MESSAGE MONITORING

[75] Inventors: Bernie McKibben, Gilbert; Pramodkumar Patel, Phoenix; William Read Bassing, Chandler, all of Ariz.

[73] Assignee: Motorola, Inc., Schaumburg, Ill.

[21] Appl. No.: 08/943,023

[22] Filed: Oct. 2, 1997

[51] Int. Cl.7 .............................. H04Q 7/00; G08B 5/22
[52] U.S. Cl. ................. 455/31.1; 455/32.1; 455/67.1; 340/825.44; 340/825.06
[58] Field of Search ........................... 455/31.1, 38.1, 455/9, 500, 507, 517, 67.1, 35.1, 32.1; 340/825.44, 311.1, 825.52, 825.47, 825.06, 825.15

[56] References Cited

U.S. PATENT DOCUMENTS

| | | | |
|---|---|---|---|
| 4,951,044 | 8/1990 | Nelson et al. | 340/825.44 |
| 5,101,500 | 3/1992 | Marui | 455/32.1 |
| 5,133,082 | 7/1992 | White | 455/35.1 |
| 5,428,667 | 6/1995 | Easterling et al. | 379/59 |
| 5,451,839 | 9/1995 | Rappaport et al. | 375/224 |
| 5,473,667 | 12/1995 | Neustein | 455/31.2 |
| 5,481,254 | 1/1996 | Gaskill et al. | 340/825.52 |
| 5,497,508 | 3/1996 | George | 455/161.2 |
| 5,555,446 | 9/1996 | Jasinski | 455/517 |
| 5,706,211 | 1/1998 | Beletic et al. | 709/206 |
| 5,754,119 | 5/1998 | Deluca et al. | 340/825.21 |

*Primary Examiner*—William G. Trost
*Assistant Examiner*—Erika A. Gary
*Attorney, Agent, or Firm*—Dana B. LeMoine; Frank J. Bogacz; James E. Klekotka

[57] ABSTRACT

A method and apparatus for providing global message monitoring in a paging system includes a message origination and delivery device (MODD) (20). The MODD (20) includes a data structure (100) which identifies certain users as message monitoring users. Message monitoring users receive monitored page messages (300), which are duplicates of pages sent to users being monitored. The MODD (20) sends pages to a pager in the possession of the message monitoring user.

4 Claims, 5 Drawing Sheets

METHOD AND APPARATUS FOR GLOBAL MESSAGE MONITORING

FIELD OF THE INVENTION

This invention relates in general to paging systems and, in particular, to the monitoring of pages within paging systems.

BACKGROUND OF THE INVENTION

In paging systems, subscribers receive page messages, or pages, that have been sent by users of the paging system. Generally, pages only go to the subscribers that they are intended for, and likewise, subscribers only get the pages that are intended for them.

A unique use of paging systems arises when third party subscribers, or message monitoring users, wish to obtain pages that are intended for others. One example of a message monitoring user that may wish to receive another's pages is a law enforcement agency.

In prior art systems, when law enforcement agencies wish to be message monitoring users, they are supplied with duplicate pagers so that when a page is sent to a user that they wish to monitor, the law enforcement agency also receives the page. This approach requires the law enforcement agency to maintain a number of operational pagers, one for each user being monitored. This also requires the law enforcement agency to be within the reception area of the target user so that the duplicate pager used for monitoring purposes can receive the monitored page.

In addition to law enforcement agencies, various private users may also have the need to monitor messages intended for receipt by others. Two specific examples of potential private message monitoring users that are not currently being serviced by the paging industry are employers and parents.

Many employers supply their employees with employer owned pagers for business use. The employer may need to monitor the use of these pagers to ensure that business is conducted appropriately, or to ensure that company owned pagers are not being misused. Parents or legal guardians are another example of a group of potential message monitoring users that have not been serviced by the paging industry. Parents may desire the ability to monitor the activities and pages of their children, and yet there are currently no message monitoring services available to parents.

Adapting the current law enforcement solution to private parties such as parents is not entirely feasible, because parents would not be likely to carry a duplicate pager for each child. Even if parents were to carry duplicate pagers in order to monitor multiple children, with existing prior art systems the parent would have to stay within the reception area of the children in order to receive the pages. Moreover, if all of the children being monitored are not within the same reception area, the parent cannot simultaneously monitor all children.

Paging systems currently known in the art lack a mechanism for a single user to conveniently monitor pages sent to multiple other users. As a result, when a message monitoring user is interested in monitoring multiple other users, the message monitoring user carries multiple duplicate pagers, and is confined to the reception area of the user being monitored.

What is needed is a method and apparatus for allowing a message monitoring user to conveniently receive copies of page messages intended for multiple other users. Also what is needed is a method and apparatus which provides for a message monitoring user to conveniently specify which users are to be monitored. Also what is needed is a method and apparatus to allow a message monitoring user to receive page messages intended for others even when the message monitoring user is outside of the page delivery range of the monitored parties.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DEFINITION OF TERMS

Subscriber

As used herein, "subscriber" means any user of a paging system that can receive pages.

Message Monitoring User (MMU)

As used herein, "Message Monitoring User" or "MMU" refers to a subscriber that has message monitoring privileges. That is, a message monitoring user can receive duplicates of pages that are intended for others.

Message Monitoring Pager

As used herein, "Message Monitoring Pager" refers to a pager that is carried by a message monitoring user. A message monitoring pager may be a normal pager, or may be a pager with enhanced capabilities.

Target Subscriber

As used herein, "Target Subscriber" refers to a subscriber that is the target for monitoring by an MMU.

Message Sender

As used herein, "Message Sender" refers to an originator of a page message. A message sender may or may not be a subscriber.

Monitored Page Message

As used herein, "Monitored Page Message" is a page sent to a message monitoring user, the page being in part, a duplicate of a page originally intended for a target subscriber.

Pager

As used herein, "pager" is any device that can receive numeric or alphanumeric messages over a variety of transmissions systems, including radio frequency spectrum or wire line systems. The pager can alert the pager user of the received messages and display these messages for the user.

DETAILED DESCRIPTION OF THE DRAWINGS

Figure 1:
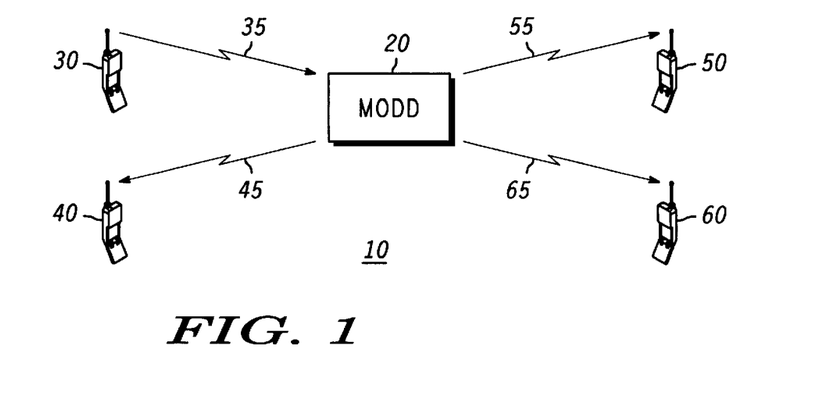
FIG. 1 shows a diagram of a paging system in accordance with a preferred embodiment of the present invention.

Turning now to the drawings in which like reference characters indicate corresponding elements throughout the several views, attention is first directed to FIG. 1.

FIG. 1 shows a diagram of a paging system in accordance with a preferred embodiment of the present invention.

Paging system 10 includes message origination and delivery device (MODD) 20, message sender 30, and paging system subscribers 40, 50, and 60. Message sender 30 communicates with MODD 20 via communication link 35. Communication link 35 is any communication link that supports the depositing of a page message with MODD 20 by message sender 30. Examples of communication link 35 include, but are not limited to, a terrestrial telephone network, a cellular telephone network, or a satellite telephone network. In addition to telephony, MODD 20 supports page messages deposited by data devices.

In a preferred embodiment, MODD 20 as shown in FIG. 1 is a network of separate MODDs which are linked together to allow for wide range, or global, page delivery. Page messages deposited with MODD 20 are dispatched to paging systems subscribers. When message sender 30 deposits a page message, a target subscriber is identified as the intended recipient of the page message. As shown in FIG. 1, the intended recipient of a page message could be any of target subscribers 40, 50, or 60. MODD 20 sends page messages to target subscribers 40, 50, and 60 via communication link 45, 55, and 65 respectively. Communication link 45, 55, and 65 are preferably radio frequency (RF) links, but other links such as optical links could also be used.

Each paging system subscriber in paging system 10 has a unique target subscriber ID. When MODD 20 receives a page message with a target subscriber ID intended for a particular subscriber, the page message is sent to that subscriber. In addition, MODD 20 supports global message monitoring which allows page messages intended for some target subscribers to be duplicated and sent to a third party user. This third party user who receives duplicates of pages originally intended for other target subscribers is a message monitoring user. The duplicate page messages received by a message monitoring user are monitored page messages. Because MODD 20 is preferably a network of devices with global coverage, there is not a necessity that the message monitoring user be in the same reception area as the target subscriber.

For convenience, FIG. 1 shows a single message sender 30. Any number of message senders 30 can be supported by paging system 10. Further, FIG. 1 shows three target subscribers, but paging system 10 can support any number of target subscribers.

As shown in FIG. 1, subscriber 40 is a message monitoring user. A subscriber becomes a message monitoring user when the service provider provisions MODD 20 such that the subscriber is enabled to monitor the messages received by a number of target subscribers. Those target subscribers to be monitored may be a list of subscribers provided by a warrant in the possession of a law enforcement agency. Or those target subscribers to be monitored can correspond to a number of pagers, as in the case of a parent who wishes to monitor a number of pagers for children. Of course, parents are only examples of the wide variety of possible private message monitoring users. Accordingly, where the term "parent" is used herein, any term describing a lawful private message monitoring user could be substituted therefor while still practicing the present invention.

In an example of message monitoring operation, when message sender 30 deposits a message for either target subscriber 50 or target subscriber 60, the page message is sent to the target subscriber for which it is intended, and is also duplicated and sent as a monitored page message to message monitoring user 40. The method and apparatus of the present invention allow a message monitoring user to receive monitored page messages intended for multiple target subscribers using a single pager.

As will be described subsequently, MODD 20 maintains multiple lists of target subscriber IDs, each of which corresponds to a particular message monitoring user. When pages are received for a target subscriber which is being monitored by a message monitoring user as specified in the list within MODD 20, then a message monitoring user will receive a copy of the page message as a monitored page message. Because MODD 20 sends to a single message monitoring user monitored page messages from potentially a large number of target subscribers, it is desirable for the message monitoring user to have the ability to select which target subscriber IDs should alert the message monitoring user. As will be described, in a preferred embodiment the message monitoring pager held by message monitoring user 40 allows the user to specify which target subscribers are to be monitored.

It should also be noted that all pagers used within a paging system could be identical and could support the message monitoring capability even though not all subscribers may have access to the Global Message Monitoring capability. This is because the service provider provisions a user for Global Message Monitoring at the MODD, thereby allowing a user to receive the service.

Another enhanced feature of the message monitoring pager is that it is capable of receiving messages under multiple pager identifications. Conventional pagers have a unique pager identification. A page meant for a conventional pager has the unique identification attached to it which is used to indicate to the pager that a valid message is meant to be received. A message monitoring pager can be provisioned by the service provider to accept all messages with target subscriber pager identifications. In this way, the MODD does not need to assign the MMU pager identification to all duplicate pages.

The method and apparatus of the present invention provides many advantages. Advantages exist for law enforcement agencies, parents, and other MMUs in that pages intended for multiple target subscribers are monitored with a single MMU pager. Monitoring by the MMU occurs in a way that is unobtrusive and imperceptible to the target subscribers. Also, when using an MMU pager, the MMU can enable/disable message monitoring on a per target subscriber basis by interacting with the pager. Further, the MMU can be located anywhere in a global system and does not need to be confined to the page delivery area of the target subscriber.

The method and apparatus of the present inventions provide advantages for both the service provider and the message monitoring user. Subscribers are generally provisioned for a basic set of paging services. Message monitoring users can then be provisioned for the additional ability to monitor pages intended for at least one other target subscriber. The result is an advantageous situation for both the service provider and the message monitoring user. The service provider has a new service that commands a premium, and the subscriber has a new desirable feature.

Figure 2:
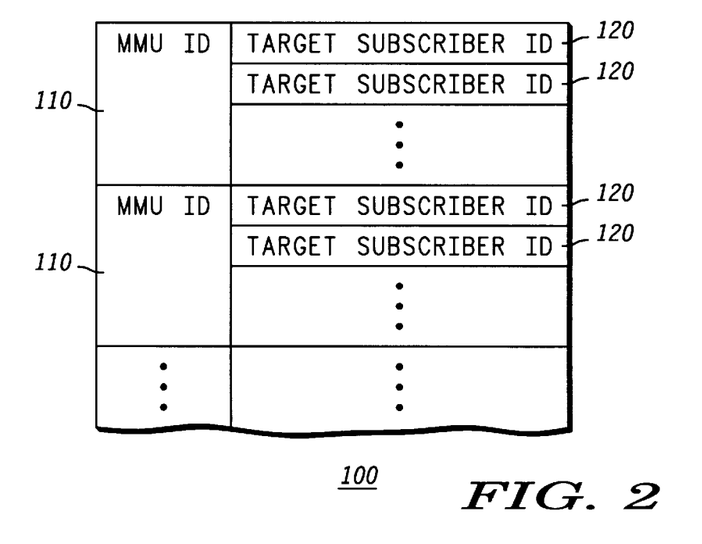
FIG. 2 shows a diagram of a data structure maintained within a message origination and delivery device in accordance with a preferred embodiment of the present invention.

FIG. 2 shows a diagram of a data structure maintained within MODD 20 in accordance with a preferred embodiment of the present invention. Data structure 100 includes message monitoring user (MMU) IDs 110, and target subscriber IDs 120. Data structure 100 includes one MMU ID 110 for each message monitoring user registered with MODD 20 (FIG. 1). For each MMU ID 110 included within data structure 100, multiple target subscriber IDs 120 can be maintained. Each target subscriber ID 120 corresponds to a target subscriber being monitored by the corresponding message monitoring user specified by MMU ID 110. Because data structure 100 is maintained within MODD 20 (FIG. 1), the MODD is capable of associating multiple target subscribers with a single message monitoring user.

When page messages are deposited with origination and delivery device, the target subscriber for which the page message is intended is looked up in data structure 100. If the target subscriber ID 120 is found for the target subscriber, then a monitored page message is sent to the message monitoring user specified by the MMI ID 110 which corresponds to the target subscriber ID 120. In a preferred embodiment, the location of each MMU is determined prior to duplicate page delivery. If the MMU is not within the range of the target subscriber MODD, the MODD will send the page to the MODD which services the area where the MMU is located. The MMU MODD will then deliver the duplicate page to the MMU. In this way, the MMU need not be confined to the delivery range of the target subscriber MODD to receive duplicate pages.

In a preferred embodiment, MODD 20 (FIG. 1) always sends monitored page messages to message monitoring users when target subscribers are found within target subscriber IDs 120. As will be described below, in an alternate embodiment, additional fields are included in data structure 100 within MODD 20 which support the conditional sending of monitored page messages to message monitoring users.

Figure 3:
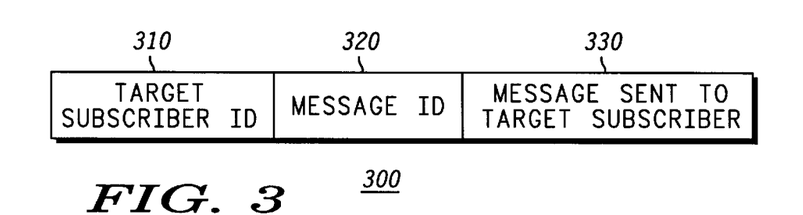
FIG. 3 shows a diagram of a monitored page message sent to a message monitoring user in accordance with a preferred embodiment of the present invention.

FIG. 3 shows a diagram of a monitored page message sent to a message monitoring user in accordance with a preferred embodiment of the present invention. Monitored page message 300 includes target subscriber ID 310, message ID 320, and original target subscriber message 330. Monitored page message 300 is generated by MODD 20 (FIG. 1) when data structure 100 (FIG. 2) specifies that a message monitoring user is to receive a monitored page message. Target subscriber ID 310 includes the ID of the target subscriber for which the original page message was intended. Message ID 320 includes a unique identification for the page message being sent. Message 330 includes all or part of the original page message deposited with MODD 20 (FIG. 1) by a message sender. Monitored page message 300 is sent by MODD 20 (FIG. 1) to the message monitoring user where it is received by a conventional pager or a message monitoring pager.

Figure 4:
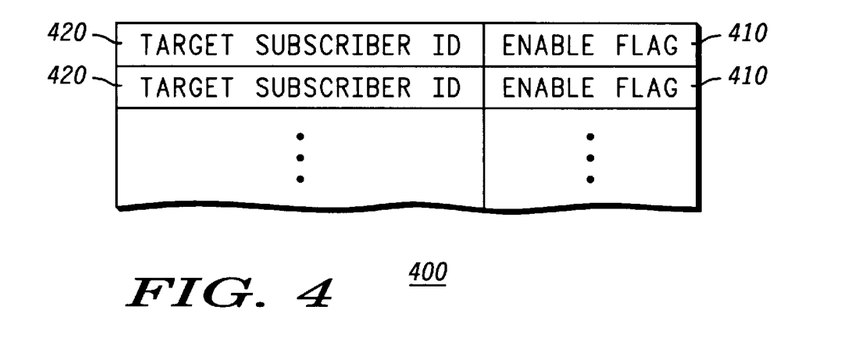
FIG. 4 shows a diagram of a data structure maintained within a message monitoring pager in accordance with a preferred embodiment of the present invention.

FIG. 4 shows a diagram of a data structure maintained within a message monitoring pager in accordance with a preferred embodiment of the present invention. Data structure 400 includes target subscriber ID 420 and enable flag 410. Target subscriber ID 420 and enable flag 410 occur in pairs within data structure 400. The number of pairs corresponds to the number of target subscribers being monitored by this particular message monitoring pager. By maintaining data structure 400, a message monitoring pager can selectively alert a message monitoring user of received monitored page messages. If a monitored page message is received which is a copy of a page message originally intended for a particular target subscriber, and if in data structure 400 the enable flag 410 is raised corresponding to the correct target subscriber ID 420, then the message monitoring user is alerted. In this way, a message monitoring pager can have a potentially very large number of target subscribers which it is capable of monitoring, but only a selected subset of those target subscribers are actively monitored at any particular time.

Enable flag 410 is an example of message monitoring status information. Message monitoring status information specifies the status information regarding a target subscriber that a message monitoring user would consider relevant. Message monitoring status information also preferably includes statistics for the target subscriber, such as how many monitoring pages have been received, and how many have been received by the pager but did not result in notifications of the message monitoring user.

As will be discussed subsequently, data structure 400 can be created within message monitoring pager in multiple ways. One method is for a message monitoring user to interact with the pager and enter the target subscriber ID and the enable flag. A preferred method of building data structure 400 is more automatic. When a message monitoring pager receives a monitored page message for a target subscriber which is not represented within data structure 400, message monitoring pager automatically creates a record within data structure 400, inserts the target subscriber ID, and raises the enable flag. The message monitoring user is automatically alerted, and the duplicate page is displayed on the message monitoring user's pager. The message monitoring user can later modify this automatically created record to enable or disable the active monitoring of this target subscriber.

Figure 5:
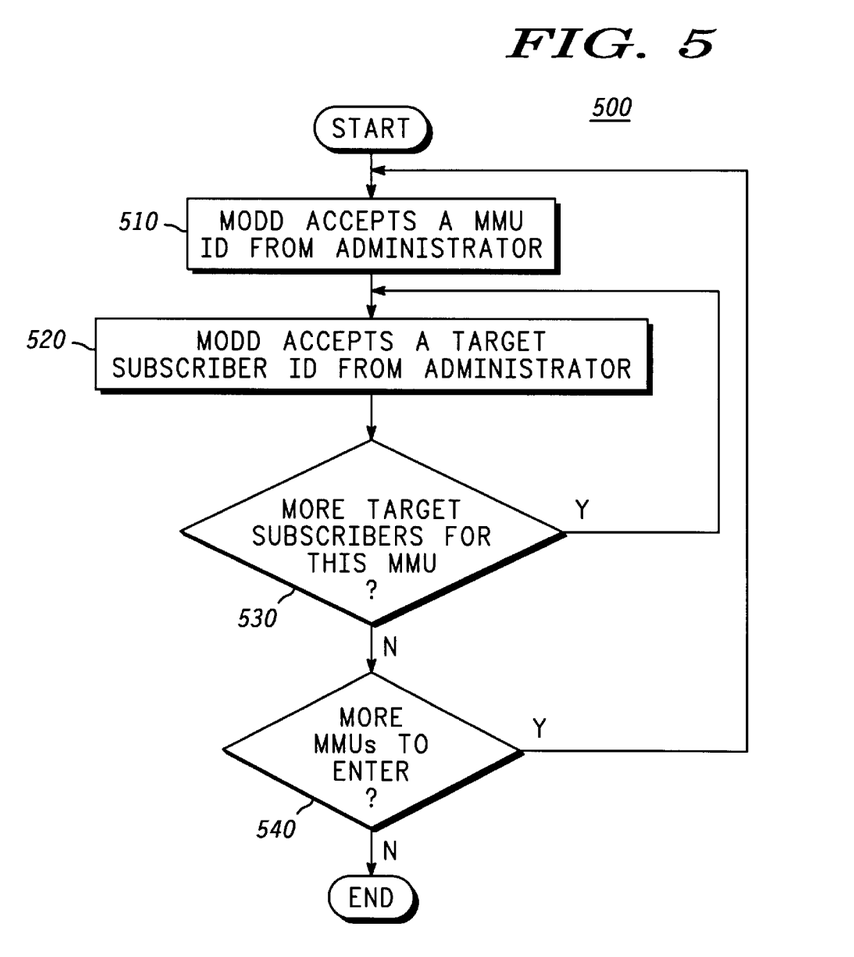
FIG. 5 shows a flow chart describing the steps in a service provider configuration session in accordance with a preferred embodiment of the present invention.

FIG. 5 shows a flowchart describing the steps in a service provider configuration session in accordance with a preferred embodiment of the present invention. Method 500 describes the steps that result in the creation of data structure 100 (FIG. 2) within MODD 20 (FIG. 1). Method 500 is a privileged operation and is usually performed by an administrator within paging system 10. (FIG. 1). Individual users and target subscribers do not generally have the ability to change data structure 100 (FIG. 2), and so would not typically perform the steps in method 500.

In step 510 the MODD accepts a message monitoring user ID from the administrator. This MMU ID corresponds to MMU ID 110 shown in FIG. 2. After the administrator has entered an MMU ID, the MODD accepts a target subscriber ID from the administrator in step 520. This target subscriber ID corresponds to target subscriber ID 120 as shown in data structure 100 in FIG. 2. Then in step 530, the MODD queries the administrator as to whether more target subscriber IDs are to be associated with the MMU ID already entered. If so, processing branches back to step 520 where more target subscriber IDs can be entered. When this branch is taken, and multiple target subscriber IDs are entered, then data structure 100 as shown in FIG. 2 will have multiple target subscriber IDs 120 associated with a single MMU ID 110.

After step 530 when there are no more target subscribers for this MMU, processing branches to step 540. The decision block in step 540 affects the larger loop within method 500 that allows multiple MMU IDs to be entered. When in step 540, if it is determined that there are more message monitoring users to be entered, then processing branches back to step 510 where the MODD accepts another message monitoring user ID, and processing continues until all message monitoring users have been entered. Method 500 is repeated whenever a new message monitoring user is to be included within paging system 10 (FIG. 1) or whenever a new target subscriber ID is to be entered for a particular MMU.

Figure 6:
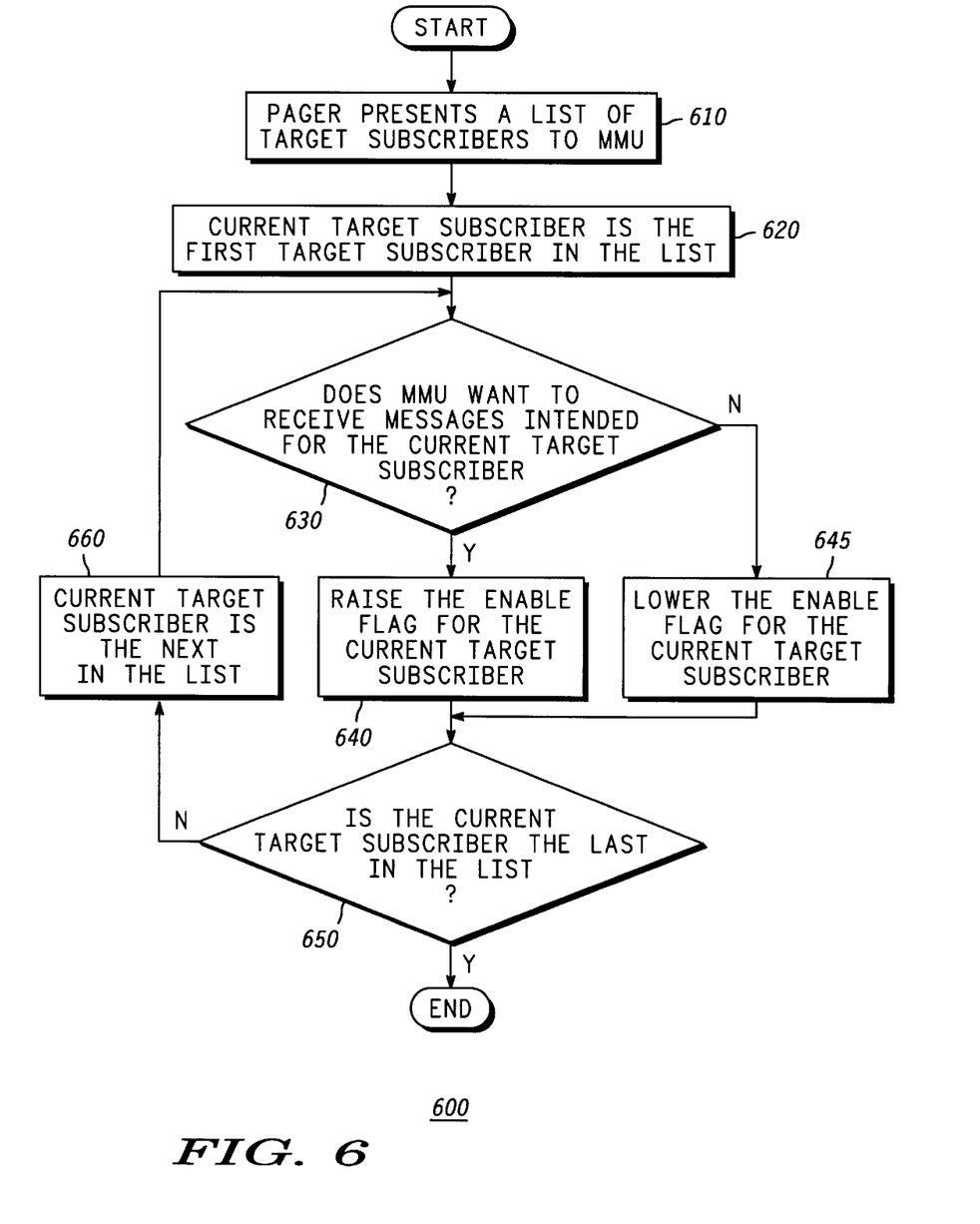
FIG. 6 shows a flow chart for a method of updating a list of target subscribers in a pager in accordance with a preferred embodiment of the present invention.

FIG. 6 shows a flowchart for a method of updating a list of target subscribers in a pager in accordance with a preferred embodiment of the present invention. Method 600 as shown in FIG. 6 shows a method whereby a message monitoring user can interact with a message monitoring pager to modify data structure 400 (FIG. 4). Method 600 assumes that data structure 400 (FIG. 4) already exists within the message monitoring pager.

In step 610 the pager presents a list of target subscribers to the message monitoring user. The list of target subscribers corresponds to target subscriber IDs 420 (FIG. 4). In step 620 the first target subscriber in the list is designated the current target subscriber. In step 630 the message monitoring pager allows the message monitoring user to decide whether or not alerts should be generated for monitored page messages destined for the current target subscriber. If alerts are to be generated for the current target subscriber, then processing continues with step 640 where the enable flag is raised for the current target subscriber. If, on the other hand, the message monitoring user does not want to be alerted when monitored page messages are received corresponding to the current target subscriber, processing proceeds with step 645 where the enable flag for the current target subscriber is lowered.

Once processing has been completed in either step 640 or step 645, processing then continues with step 650. Step 650 is a decision as to whether the current target subscriber is the last target subscriber in the list. If it is not, then processing proceeds with step 660 where the current target subscriber is changed to be the next target subscriber in the list, and then processing is passed back to decision block 630. If, in step 650, the current target subscriber is the last in the list, then processing ends. The loop within method 600 which comprises step 660 allows the message monitoring user to update the enable flag 410 for each target subscriber referenced in data structure 400. In an alternate embodiment, the update process can be exited without scrolling through the entire list of target subscribers. In addition, a target subscriber enable flag could be individually accessed and changed.

The interaction between an MMU and a pager as exemplified in method 600 is advantageous. Ease of use for MMU has increased, and local enable and disable on an individual target subscriber basis is a very desirable feature for both the private MMU and the law enforcement agency.

Figure 7:
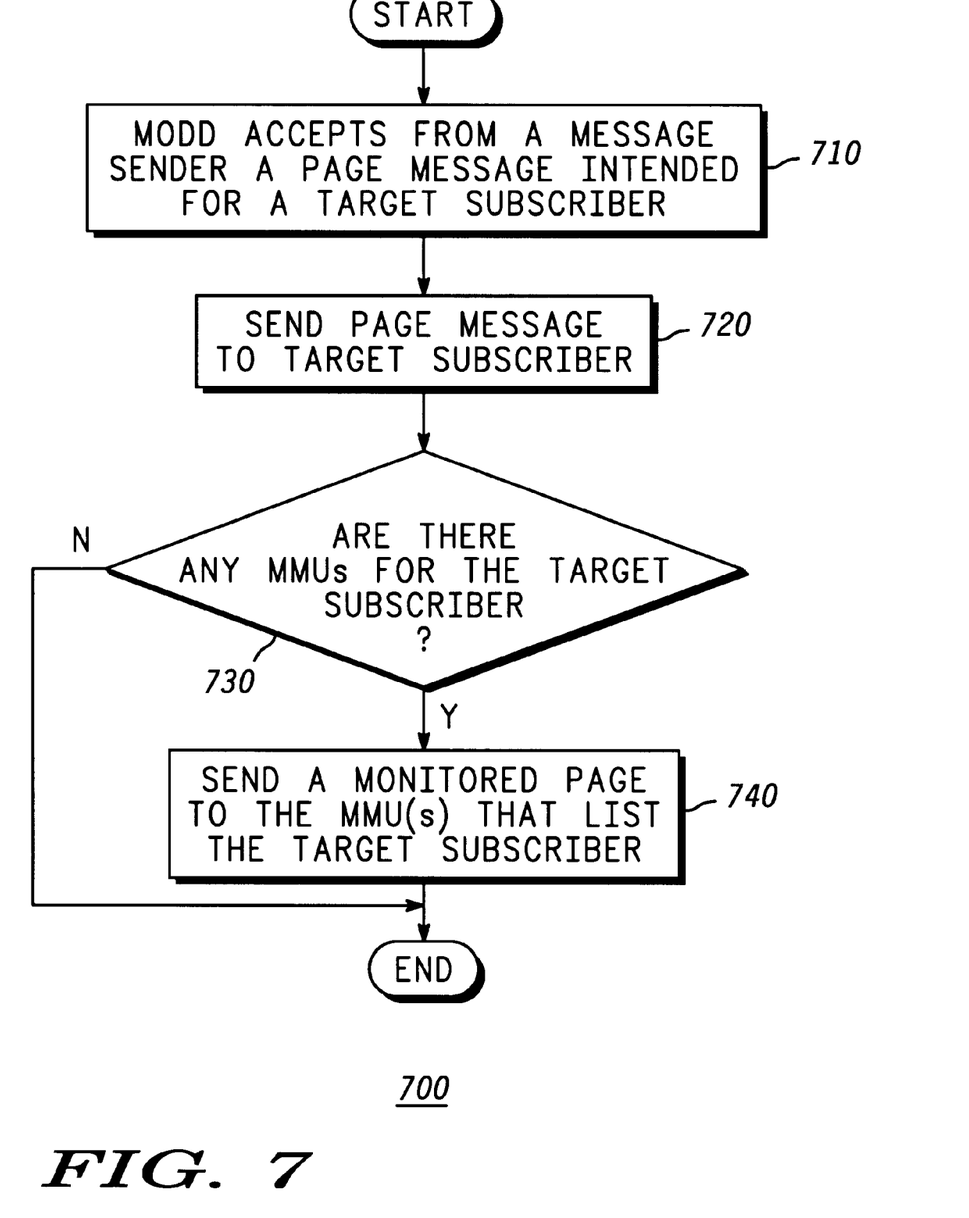
FIG. 7 shows a flow chart for a method of sending a monitored page message to a message monitoring user in accordance with a preferred embodiment of the present invention.

FIG. 7 shows a flowchart for a method of sending a monitored page message to a message monitoring user in accordance with a preferred embodiment of the present invention. In a preferred embodiment, method 700 is executed by a MODD. In step 710 the MODD accepts from a message sender a message intended for a target subscriber. Then in step 720, the MODD sends the page message to the target subscriber specified in step 710.

Processing proceeds to step 730 where the MODD decides if there are any message monitoring users which correspond to the target subscriber. The MODD performs step 730 by searching data structure 100 (FIG. 2) for the target subscriber ID which corresponds to the target subscriber specified in step 710. If the target subscriber is found in a target subscriber ID 120 (FIG. 2), then the corresponding MMU ID 110 (FIG. 2) specifies a message monitoring user which is to receive a monitored page message.

If, as a result of step 730, the MODD determines that there are no message monitoring users for the target subscriber, processing ends. If, on the other hand, in step 730 the MODD determines that a message monitoring user exists for the target subscriber, then processing proceeds to step 740 where a monitored page message is sent to any message monitoring user that lists the target subscriber. When the MMU is not in the same reception area as the target subscriber, then as a part of step 740, the MMU location is determined, and the message monitored page is dispatched to be transmitted to another MODD within the reception area where the MMU is located. This second MODD then delivers the page to the MMU.

It should be noted that a single target subscriber may be listed within data structure 100 (FIG. 2) multiple times. In this case, it is possible for multiple message monitoring users to receive a monitored page message corresponding to a single page message deposited by a message sender for a single target subscriber.

Figure 8:
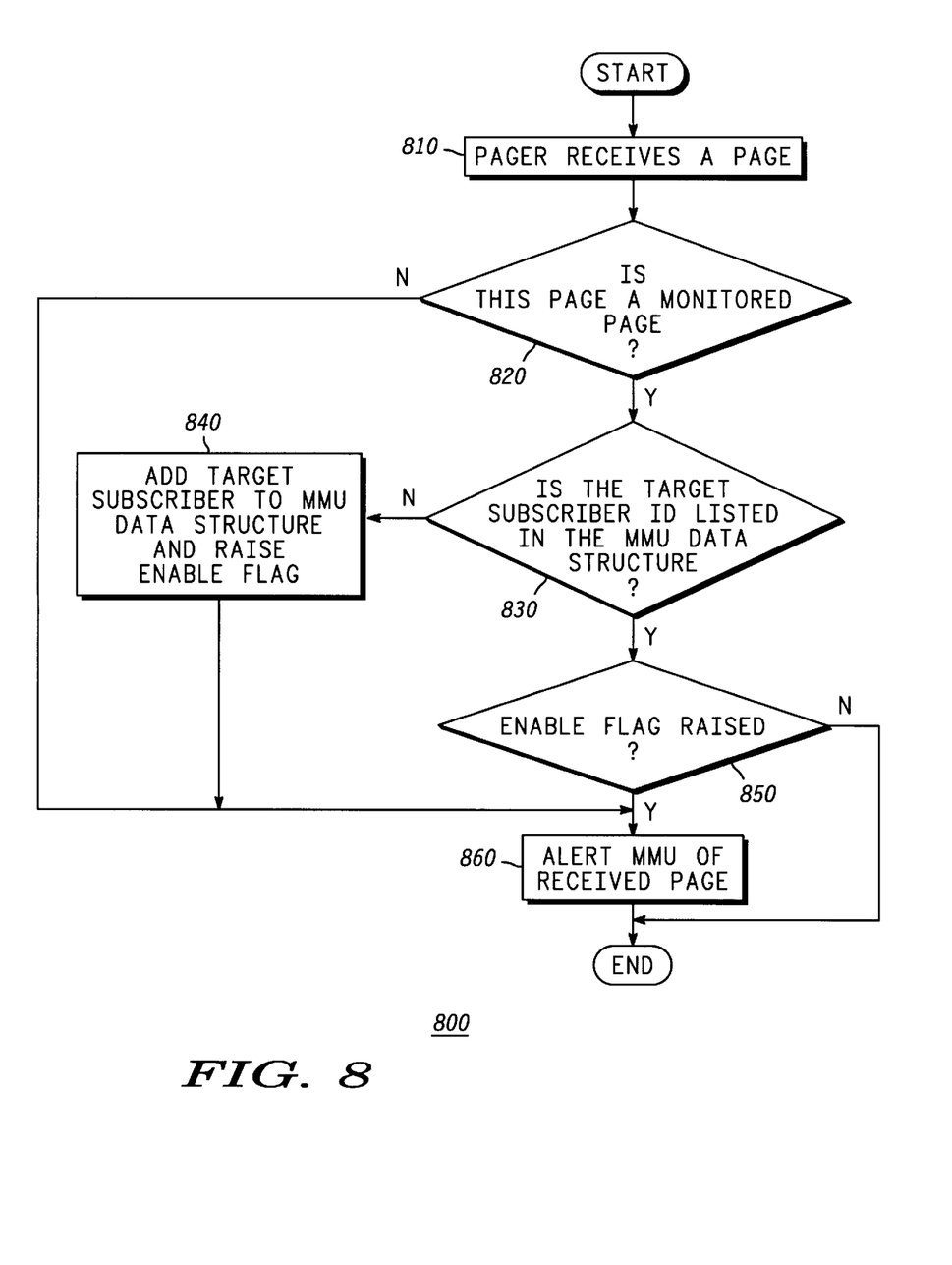
FIG. 8 shows a flow chart for a method of receiving a monitored page message in accordance with a preferred embodiment of the present invention.

FIG. 8 shows a flowchart for a method of receiving a monitored page message in accordance with a preferred embodiment of the present invention. In a preferred embodiment, method 800 is executed by a pager. In step 810 a message monitoring pager receives a page. In step 820 the message monitoring pager determines if this page is a page originally intended for the message monitoring user, or if it is a monitored page which was originally intended for a target subscriber being monitored. If, in step 820, the message monitoring pager determines that this page is not a monitored page message, processing proceeds to step 860 where the message monitoring user is alerted of the received page.

If, in step 820, the message monitoring pager determines that this page is a monitored page, then processing proceeds to step 830 where the message monitoring pager searches data structure 400 (FIG. 4) for a target subscriber ID. In a preferred embodiment, the monitored page message received is of the format shown in FIG. 3 as monitored page message 300. In step 830 the message monitoring pager compares target subscriber ID 310 (FIG. 3) which was received in the monitored page message with target subscriber ID 420 (FIG. 4) included within the pager. If a match is found, processing proceeds to step 850 where the status of the enable flag is checked. If the enable flag is raised, then the message monitoring user is alerted of the received page in step 860, otherwise the user is not alerted. If, in step 830, the target subscriber ID is not found within the pager, processing proceeds to step 840 where the target subscriber listed in the monitored page message is added to data structure 400 (FIG. 4) and the corresponding enable flag is raised. Processing then proceeds to step 860 where the message monitoring user is alerted of the received page.

An exemplary advantageous application of global message monitoring can be found with parents and their children. A parent purchases a number of pagers, at least one being a message monitoring pager, and contracts with the service provider of paging system 10 (FIG. 1) to have the remaining pagers designated as target subscribers to be monitored by the message monitoring pager. The parent then gives the non-message monitoring pagers to children whose pages are duplicated as monitored page messages and sent to the parent. The parent can then decide which of the children are to be monitored by interacting with the message monitoring pager using the method as shown in FIG. 6.

ALTERNATE EMBODIMENT

In an alternate embodiment the MODD does not send monitored page messages to the message monitoring user for all target subscribers listed in data structure 100 (FIG. 2). In this alternate embodiment, data structure 100 further includes an enable flag analogous to enable flag 410 in data structure 400 of FIG. 4. When the MODD receives a page message for a target subscriber listed in data structure 100, the enable flag corresponding to that target subscriber is then checked in a method analogous to method 800 (FIG. 8) of the preferred embodiment as previously discussed. In this way, the decision whether or not to alert a message monitoring user is performed within the MODD rather than within the pager held by the message monitoring user. This, in turn, allows a conventional pager to be used as a message monitoring pager. Because no special processing is required within the pager to receive the monitored page messages, a conventional pager can be used by the message monitoring user. If, in this alternate embodiment, a message monitoring user wishes to change the value of the enable flag included within data structure 100, the message monitoring user initiates a subscriber service session with the MODD. This subscriber service session is analogous to method 600 as shown in FIG. 6. In addition, the message monitoring user may also view duplicate messages which are available for monitoring through a service session.

In summary, the method and apparatus of the present invention provides an advantageous global message monitoring feature of a paging system. Multiple target subscribers can be monitored with a single MMU pager or page receiver. The monitoring is imperceptible to the target subscribers being monitored. The MMU pager allows the MMU to enable or disable message monitoring on a per target subscriber basis. Also, the MMU is not confined to be in the same page delivery area of the target subscribers being monitored.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A method of operating a message origination and delivery device in a paging system, the method comprising:

receiving a first page message with said message origination and delivery device, said first page message only intended by a first message sender to be received by a first system subscriber;

determining if said first message sender is a first target subscriber by comparing a target subscriber ID of said first system subscriber to a list of subscribers associated with a message monitoring user, said list comprising subscribers being monitored by said message monitoring user;

when said first message sender is a first target subscriber, creating a first monitored page message, sending said first monitored page message to said message monitoring user, wherein said first monitored page message comprises the target subscriber ID associated with said first page message, a message ID, and data duplicated from said first page message, and sending said first page message to said first system subscriber;

receiving a second page message with said message origination and delivery device, said second page message only intended by a second message sender to be received by a second system subscriber;

determining if said second message sender is a second target subscriber by comparing a target subscriber ID associated with said second system subscriber to said list of subscribers associated with said message monitoring user; and when said second message sender is a second target subscriber, creating a second monitored page message, sending said second monitored page message to said message monitoring user, wherein said second monitored page message comprises the target subscriber ID associated with said second page message, a message ID, and data duplicated from said second page message, and sending said second page message to said second system subscriber.

2. The method of claim 1, wherein said message monitoring user is a parent.

3. The method of claim 1, said method further comprising:

receiving target subscriber ID information identifying a target subscriber from an administrator, said administrator being coupled to said message origination and delivery device, where said target subscriber ID information identifies a target subscriber; and receiving target subscriber status information from a message monitoring user.

4. The method of claim 1 wherein said message monitoring user is in a different reception area from said message origination and delivery device, and wherein sending a monitored page message comprises:

locating said message monitoring user; and dispatching said monitored page message to a second message origination and delivery device for delivery to said message monitoring user in said different reception area.

* * * * *